(12) United States Patent
Switzer, Jr.

(10) Patent No.: US 6,457,029 B1
(45) Date of Patent: Sep. 24, 2002

(54) COMPUTER METHOD AND SYSTEM FOR SAME DOCUMENT LOOKUP WITH DIFFERENT KEYWORDS FROM A SINGLE VIEW

(75) Inventor: James H. Switzer, Jr., Candor, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/470,587

(22) Filed: Dec. 22, 1999

(51) Int. Cl.[7] .................................................. C06F 15/00
(52) U.S. Cl. ...................................................... 707/515
(58) Field of Search ................................ 707/515, 101, 707/505, 303, 1; 709/226

(56) References Cited

U.S. PATENT DOCUMENTS

| | | | |
|---|---|---|---|
| 5,555,368 A | 9/1996 | Orton et al. ................. | 345/807 |
| 5,640,579 A | 6/1997 | Koppolu et al. ............. | 707/526 |
| 6,189,002 B1 * | 2/2001 | Roitblat ........................ | 707/1 |
| 6,289,334 B1 * | 9/2001 | Reiner et al. ................ | 707/303 |
| 6,289,382 B1 * | 9/2001 | Bowman-Amuah ......... | 709/226 |
| 6,301,584 B1 * | 10/2001 | Ranger et al. ............... | 707/505 |

* cited by examiner

*Primary Examiner*—Safet Metjahic
*Assistant Examiner*—Haythim Alaubaidi
(74) *Attorney, Agent, or Firm*—Scully, Scott, Murphy & Presser; John R. Pivnichny

(57) ABSTRACT

A method and system for organizing documents in a database into categories within a single view. The method comprises the steps of providing a database having one or more documents storing data in one or more fields; providing a view having a column formula, said column formula being adapted to run only once upon selecting said view; coding a plurality of statements, each said statement referencing data in said one or more documents storing data one or more fields; concatenating said plurality of statements to form said column formula; and selecting said view to organize and display said one or more documents in categories.

9 Claims, 3 Drawing Sheets

COMPUTER METHOD AND SYSTEM FOR SAME DOCUMENT LOOKUP WITH DIFFERENT KEYWORDS FROM A SINGLE VIEW

BACKGROUND OF THE INVENTION

The present invention generally relates to computer systems, and more particularly, to a method and system for providing efficient same document lookup with different keywords from a single view.

Lotus Notes is one of the most popular hierarchical database management systems (HDBMS) in use today. It is a full-featured, robust groupware application developed by Lotus, which is now part of IBM. Lotus Notes is a client-server platform that enables users to access, share and manage information over a network. Lotus Notes was one of the first applications to support a plurality of distributed databases of documents that could be accessed by users across a network. Lotus Notes enables users to create document databases, post them to a network and share them with their coworkers. Its sophisticated replication enables users to work with local copies of documents and have their modifications propagated throughout the entire Lotus Notes network. Lotus Notes facilitates users to access network databases containing collections of related documents, which can include forms, reports, lists, articles and other information.

A Lotus Notes client is composed of a workspace of pages, wherein each workspace page holds databases of documents as well as other information. Workspace pages are similar to file folders in that each page can be optionally named, and it contains an area in which a user can place databases and other related information.

As aforementioned, in Lotus Notes, related documents are stored in databases. For example, a user may create an address book database that contains the names, addresses and telephones of clients. The documents in a database may contain text, graphics, pictures and other types of data. Another often-used database is a mailbox database, which contains a collection of documents a user has sent or received. A user may access databases, which were created locally by the user or by a network administrator and which are available on a network server.

In database management systems, a view is a particular way of looking at a database. A single database can support numerous views. Typically, a view arranges the records of the database in some order and makes only certain fields of the database visible. The different views do not affect the physical organization of the underlying database. A Lotus Notes database displays the contents of the database in a view. A view is composed of categories of various documents. The contents of the view depend upon the database that a user is currently viewing.

In a database, a category describes documents that are contained within a particular database. In a view, categories can be expanded to reveal documents or collapsed to hide the associated documents and only leave the category visible. Clicking a graphical user interface arrow beside the category either displays or hides documents of a category. A category is a logical container that contains documents, but unlike documents it cannot be opened. Categories are main topics into which a user organizes documents. Categories appear in a database view with associated documents listed below them.

A user may create a variety of views, with each view depicting the contents of a database in a different way. For example, a user may want to create a lookup view that categorizes a plurality of documents of a particular database, that is, a view that displays categories in which plurality of documents appear in a database. Any particular document may appear in one or more categories in a view. Lotus Notes allows for a document to be categorized more than once in a view, that is, where the document appears in one or more categories in a view. Lotus Notes performs the categorization by creating a multi-value field in the particular document, which contains the categories in which the document should appear. If the category in which a document should appear changes, the document must be updated to contain this new information. In addition, if a document is referenced in a plurality of views, a categorization for each view would have to be stored in the document. The maintenance of the categories within each document requires disk storage to store the categories of one or more views in which a particular document must appear. The maintenance of the plurality of views in a Lotus Notes databases retards the performance of the database and increases database size, since each view needs to store its own index.

Therefore, what is needed, especially given today's dynamic computing environments, is a method to perform document lookup from a single view without the necessity of storing categorization information within each document.

SUMMARY OF THE INVENTION

There are many advantages to the lookup of the present invention over the standard Lotus Notes lookup. In the present invention lookup view, database documents and their children do not need to maintain categories in which they are to appear. Moreover, the present invention takes less storage than the native Lotus Notes lookup because categories do not need to be maintained. Furthermore, the present invention does not have to propagate to the children the category information of the parent documents unless the children are used in that view.

There are known schemes for indexing documents, but the present invention uses a different approach to the prior art indexing schemes. Accordingly, an object of the present invention is to facilitate the categorization of documents based on formulas instead of lists in cascading views.

The prior art approach to solving the present problem of addressing a document with different keywords is to have several views associated with the document. Therefore, another object of the present invention is to eliminate the need for the multiple views and allow the same document to be located with different keywords from one database view.

It is another object of the present invention is to facilitate a plurality of Lotus Notes programming environments in varied industries to utilize the present lookup utility.

It is another object of the present invention is to enable a user to maintain the same document in many categories within a single view without storing categorization data within the document.

Yet another object of the present invention to facilitate the dynamic creation of categories.

DETAILED DESCRIPTION OF THE PREFERRED EMBODIMENT OF THE INVENTION

Figure 1:
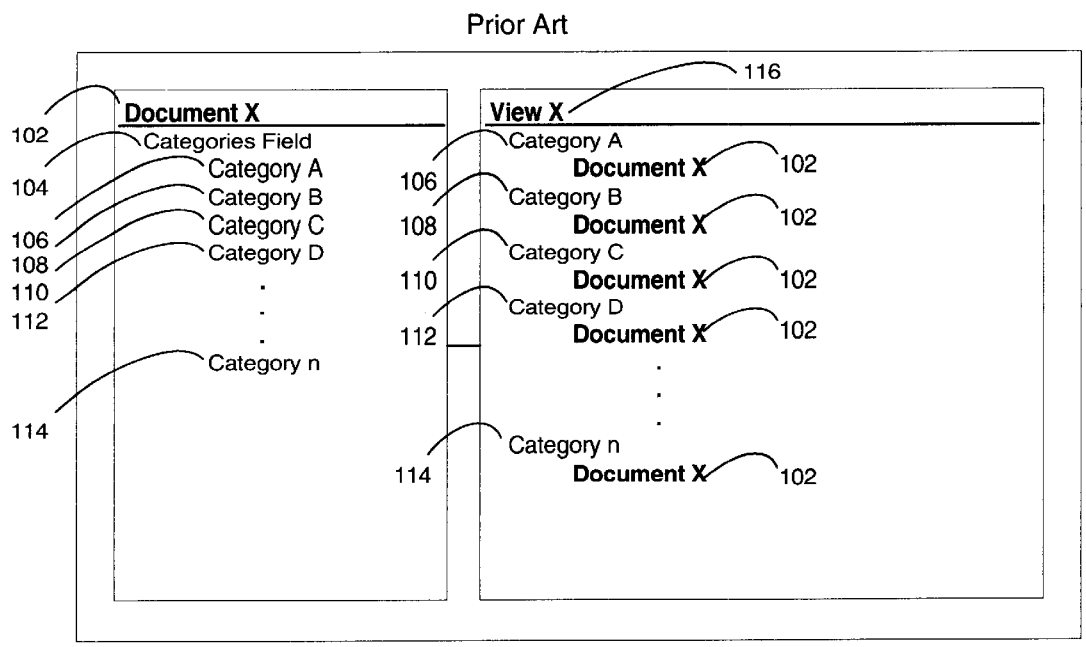
FIG. 1 is an exemplary prior art view showing how a document can be categorized more than once in a view via the creation of a multi-value field containing the categories in which the particular document must appear, wherein the document stores the multi-value field containing the categories in which it is to appear.

FIG. 1 is exemplary of a database view showing how a document can be categorized more than once in the view. More specifically, the particular view X 116 depicted in FIG. 1, identifies a document X 102, which is to appear in categories A, . . . , n (106, . . . ,114). The way this is accomplished is by creating a multi-value field 104 in the document 102, which contains the categories in which the document is to appear. Furthermore, if a document was referenced in multiple views, a categorization for each view would have to be stored within the document. For example, if another view references document X, a multi-value field containing categories in which the document is to appear, likewise is stored within the document. In this approach, it is the document that relays to the view the information regarding in which categories the document will be displayed. This is the case because the document relays the information regarding the categories in which it is to appear to the view, which then displays the information.

For example, assume that a contact document containing contact information for "Steven Smith" exists in a database. Further, assume that a user wants to create a view, which would categorize this document to appear in the following categories: Smith, Steven; New York; and All Documents. In the prior art approach, the document would need to store the three categories in a multi-value field, so that the view created by the user could represent this document in the three mentioned categories.

While the above-mentioned approach is useful, it presents some shortcomings when a database of many documents needs to be categorized. In particular, the since documents store category information the database requires increased storage and the required multiple views retard database performance and further increase storage requirements for the database. By not storing category information in documents, only a single lookup would view is necessary, resulting in reduced database size and improved database performance.

Figure 2:
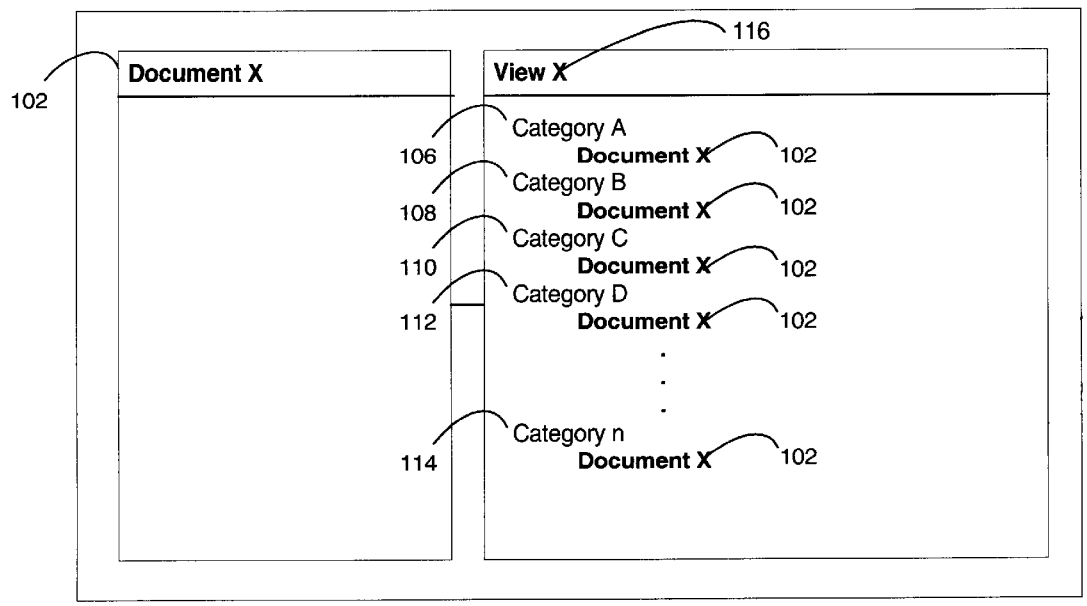
FIG. 2 is an exemplary screen display of a lookup view of the present invention showing how a document can be categorized more than once in a view, wherein the document does not need to store the categories in which it is to appear.

FIG. 2 exemplifies the present invention, which overcomes the foregoing problems by eliminating the need to store category information within a particular document. More specifically, a particular view X 116 depicted in FIG. 2, identifies a document X 102, which is to appear in categories A, . . . , n (106, . . . ,114), and which does not store category information. Unlike the prior art approach, the present invention creates a view that specifies in which categories the document is to appear. The present invention accomplishes the foregoing by creating a view containing a list within the view column, which concatenates together the categories in which an individual document must appear.

For example, if a document is to be looked up using three keys, i.e., categories, it can be represented in a single view by concatenating the three needed keys into one view column. The view achieves this result by having a column formula that contains a plurality of coding statements to create the categories in which a document is to appear.

For example, assume that a contact document "Doc," containing contact information for "Steven Smith" exists in a database. Further, assume that a user wants to create a view, which would categorize this document to appear in the following categories: Smith, Steven; New York; and All Documents. To achieve this result, the present invention creates a view containing a formula of a plurality of statements in the following form:

If document "Doc" is a contact document Then
    Category is Last Name, First Name
Else
    Category is All Documents
:

If document "Doc" f is a contact document Then
    Category is City
Else
    Category is All Documents
:

If document "Doc" is a contact document Then
    Category is State
Else
    Category is All Documents
:

Category is All Documents

In the above example, the plurality of statements appear between the colon symbol. The colon concatenates the first category with the second category and the third category. If document "Doc" is not a contact document, the user may decide to place the document into the All Documents category. As illustrated in the above example, the present invention provides a view of categories in which a document is to appear, which is equivalent to that of the prior art, except that category information is not stored within the document.

The present invention provides advantages over the prior approach. The present invention eliminates the many views necessary to do lookups by enabling one single point of contact for performing application lookups. Further, a single view reduces the time it takes to develop code since all lookups are performed from the same view. This is advantageous because it reduces the size of the database, since one view index is maintained versus the n-number of lookups and associated keys that are otherwise necessary to perform the same functionality. Moreover, maintenance is much simpler because data is obtained from a single source.

Figure 3:
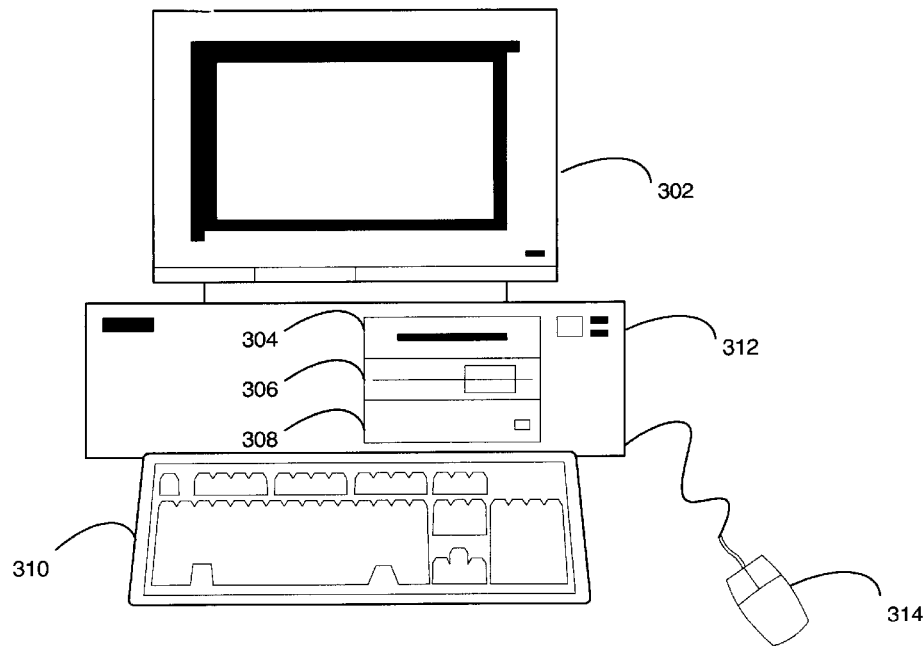
FIG. 3 is an exemplary external view of a computer system that can be employed to practice the present invention.

FIG. 3 illustrates an external view of a computer system suitable for carrying out the present invention. Viewed externally in FIG. 3, a computer system has a central processing unit 312, which has a floppy disk-drive 306, a CD-ROM drive 304 and a hard-drive 308 (not depicted externally). A computer system can accommodate a variety drives. The number and type of drives generally vary with different computer system configurations. The computer system has a splay 302, upon which information is displayed. A keyboard 310 and a mouse 314 are standard and generally available input devices.

Figure 4:
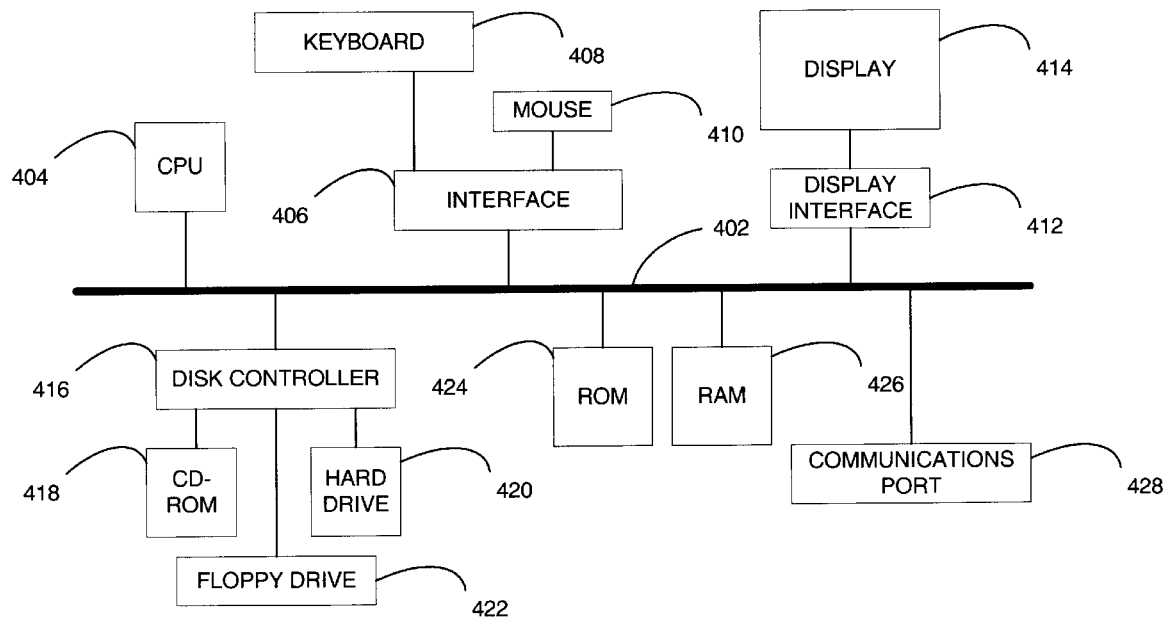
FIG. 4 is an exemplary block diagram of the internal hardware components of the computer system depicted in FIG. 3, which can be used to practice the present invention.

FIG. 4 depicts a block diagram of the internal hardware of a computer system of FIG. 3. A bus 402 serves as the main information highway, interconnecting the other components of the computer system. The CPU 404 is the central processing unit of the computer system, which performs calculations and logic operations required to execute programs. The read only memory (ROM) 424 and the random access memory (RAM) 426 constitute the main memory of the computer system. The disk controller 416 interfaces one or more drives to the computer system bus 402. The drives may include a floppy disk-drive 422, internal or external hard-drive 420, and a CD-ROM or DVD (Digital Video Disk) drive 418. A display interface 412 interfaces a display 414 and the bus 402, permitting information from the bus to be viewed on the display. Communication with external devices can be accomplished over the communications port 428.

Figure 5:
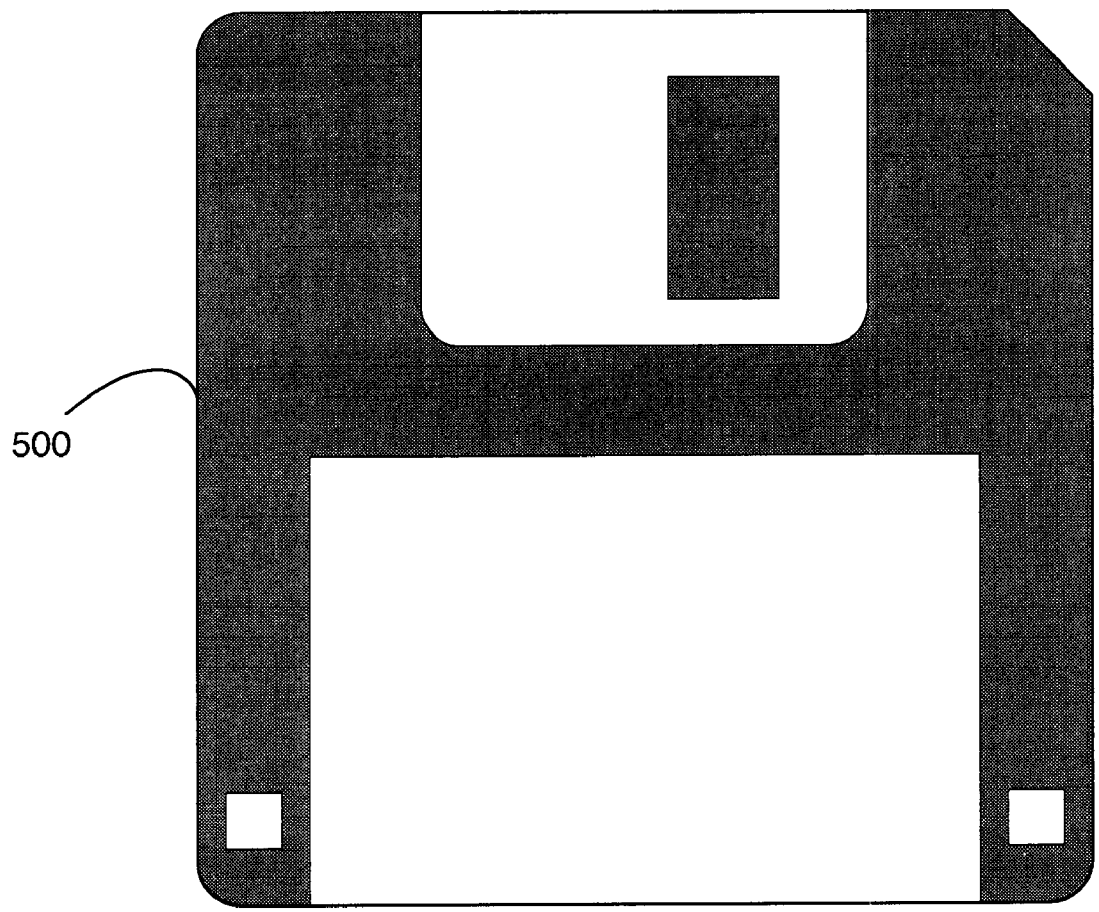
FIG. 5 illustrates an exemplary storage medium, which may be employed to hold a computer program for implementing the present invention.

FIG. 5 illustrates an exemplary storage medium 500, which can be employed to hold a computer program for implementing the present invention. This medium may be used in any suitable way with any appropriate computer to carry out the present invention. For example, this medium can used with drives such as 306 in FIG. 3 or with 422 in FIG. 4. Typically, storage media such as a floppy disk, CD-ROM or DVD disk will contain the program information for controlling the computer to enable the computer to perform its functions in accordance with the present invention.

While it is apparent that the invention herein disclosed is well calculated to fulfill the aforementioned objects, it will be appreciated that numerous modifications and embodiments may be devised by those skilled in the art, and it is intended that the appended claims cover all such modifications and embodiments as fall within the true spirit and scope of the present invention.

Having thus described our invention, what we claim as new, and desire to secure by Letters Patent is:

1. A method of organizing documents in a database into categories within a single view, said method comprising the steps of:
 (a) providing a database having one or more documents storing data in one or more fields;
 (b) providing a view having a column formula, said column formula being adapted to run only once upon selecting said view;
 (c) coding a plurality of statements, each said statement referencing data in said one or more documents storing data in one or more fields;
 (d) concatenating said plurality of statements to form said column formula; and
 (e) selecting said view to organize and display said one or more documents in categories, wherein document lookup is facilitated via said single view without storing categorization data in each said one or more documents.

2. A method of organizing documents in a database into a single view as claimed in claim 1, the method further comprising the step of:
 performing logic operation designating each of said one or more documents based on said data referenced in each of said one or more documents to a category within said single view.

3. A method of organizing documents in a database into a single view as claimed in claim 2, the method further comprising the step of:
 eliminating storage of information for said category in each of said one or more documents.

4. A system for organizing documents in a database into categories within a single view, said system comprising:
 (a) means for providing a database having one or more documents storing data in one or more fields;
 (b) means for providing a view having a column formula, said column formula being adapted to run only once upon selecting said view;
 (c) means for coding a plurality of statements, each said statement referencing data in said one or more documents storing data one or more fields;
 (d) means for concatenating said plurality of statements to form said column formula; and
 (e) means for selecting said view to organize and display said one or more documents in categories, wherein document lookup is facilitated via said single view without storing categorization data in each said one or more documents.

5. A system for organizing documents in a database into a single view as claimed in claim 4, the system further comprising:
 means for performing logic operation designating each of said one or more documents based on said data referenced in each of said one or more documents to a category within said single view.

6. A system for organizing documents in a database into a single view as claimed in claim 5, the system further comprising:
 means for eliminating storage of information for said category in each of said one or more documents.

7. A program storage device readable by a machine, tangibly embodying a program of instructions executable by the machine to perform method steps for organizing documents in a database into categories within a single view, said method steps comprising:
 (a) providing a database having one or more documents storing data in one or more fields;
 (b) providing a view having a column formula, said column formula being adapted to run only once upon selecting said view;
 (c) coding a plurality of statements, each said statement referencing data in said one or more documents storing data one or more fields;
 (d) concatenating said plurality of statements to form said column formula; and
 (e) selecting said view to organize and display said one or more documents in categories, wherein document lookup is facilitated via said single view without storing categorization data in each said one or more documents.

8. A program storage device according to claim 7, wherein said method steps further comprise the step of:
 performing logic operation designating each of said one or more documents based on said data referenced in each of said one or more documents to a category within said single view.

9. A program storage device according to claim 7, wherein said method steps further comprise the step of:
 eliminating storage of information for said category in each of said one or more documents.

* * * * *